US008181185B2

(12) United States Patent
Junkins et al.

(10) Patent No.: US 8,181,185 B2
(45) Date of Patent: May 15, 2012

(54) FILTERING OF PERFORMANCE MONITORING INFORMATION

(75) Inventors: Stephen Junkins, Bend, OR (US); Stephen H. Hunt, Felton, CA (US)

(73) Assignee: Intel Corporation, Santa Clara, CA (US)

( * ) Notice: Subject to any disclaimer, the term of this patent is extended or adjusted under 35 U.S.C. 154(b) by 1371 days.

(21) Appl. No.: 11/809,025

(22) Filed: May 31, 2007

(65) Prior Publication Data

US 2008/0301700 A1 Dec. 4, 2008

(51) Int. Cl.
*G06F 9/46* (2006.01)
*G06F 9/44* (2006.01)
*G06F 9/00* (2006.01)

(52) U.S. Cl. ......................... 718/108; 717/124; 712/227
(58) Field of Classification Search ................... None
See application file for complete search history.

(56) References Cited

U.S. PATENT DOCUMENTS

| | | | | |
|---|---|---|---|---|
| 6,076,157 | A * | 6/2000 | Borkenhagen et al. | 712/228 |
| 6,925,424 | B2 * | 8/2005 | Jones et al. | 702/187 |
| 6,971,103 | B2 * | 11/2005 | Hokenek et al. | 718/107 |
| 7,596,682 | B2 * | 9/2009 | Shippy | 712/228 |
| 7,779,238 | B2 * | 8/2010 | Kosche et al. | 712/227 |
| 7,890,735 | B2 * | 2/2011 | Tran | 712/215 |
| 2003/0177163 | A1 * | 9/2003 | Nomura | 709/102 |
| 2003/0225816 | A1 * | 12/2003 | Morrow et al. | 709/107 |
| 2005/0183065 | A1 * | 8/2005 | Wolczko et al. | 717/124 |
| 2008/0222382 | A1 * | 9/2008 | Snyder | 711/200 |

OTHER PUBLICATIONS

Intel, "Intel® VTune™ Data Collector Enabling Kit for I/O Processors," Mar. 2003, pp. 2-32.
Intel, "Intel® 64 and IA-32 Architectures Software Developer's Manual, vol. 3B: System Programming Guide, Part 2," Sections 18.11 to 18.15.9, May 2007, pp. 39-90.

* cited by examiner

*Primary Examiner* — Emerson Puente
*Assistant Examiner* — Adam Lee
(74) *Attorney, Agent, or Firm* — Trop, Pruner & Hu, P.C.

(57) ABSTRACT

In one embodiment, the present invention includes a method for receiving a signal in a filter register of a performance monitor from an execution unit to enable a field of the filter register associated with a first thread when a filter enable instruction is executed during execution of code of the first thread, receiving a thread identifier and event information in the performance monitor from the execution unit, and determining if the thread that corresponds to the received thread identifier is enabled in the filter register and if so, storing the event information in a first counter of the performance monitor. Other embodiments are described and claimed.

12 Claims, 3 Drawing Sheets

FILTERING OF PERFORMANCE MONITORING INFORMATION

BACKGROUND

Modern processors can include performance monitoring units, and additionally software tools can be used to monitor performance. However, existing performance analysis tools and techniques are incapable of accurately analyzing the complex performance issues of highly threaded workloads on multi-threaded many core architectures. Moreover, the growing popularity of thread pool (also known as a "task pool" or "work queue") style programming models increases the analysis complexity by leveraging software "tasks" that are not directly visible to an operating system (OS), software (SW) analysis tools, or hardware (HW) performance monitoring units. In task-based threading, a software thread is created and assigned to each hardware thread, and the software thread is then presented with a work queue of tasks to be performed. Thus though efficient, this threading model presents challenges for conventional performance analysis.

Developers want to target performance analysis at specific tasks running within individual software threads to realize performance analysis that is not obscured by the complexity of multiple hardware threads per core or by modern thread programming techniques. However, current hardware capabilities and monitoring tools do not support such targeted performance analysis, and instead current performance monitoring software tools often work around this problem via a crude statistical technique, which at best provides a rough approximation.

DETAILED DESCRIPTION

In various embodiments, hardware extensions and software methods may be used to support task targeted performance monitoring. This targeted performance monitoring may be referred to herein as "filtered performance monitoring." In some implementations, user-level instructions may be provided and used to enable a programmer to realize ring 3 accessibility to embodiments. More specifically, a performance monitoring unit (PMU) may include a so-called filtered status register to enable/disable filtered monitoring. In various embodiments, a PMU will only record performance events from a hardware thread that is currently enabled as "filtered" in the filtered status register. In one implementation, the filtered status register may have 1 bit corresponding to each HW thread in the core; as an example 4 bits, although the number is scalable.

Figure 1:
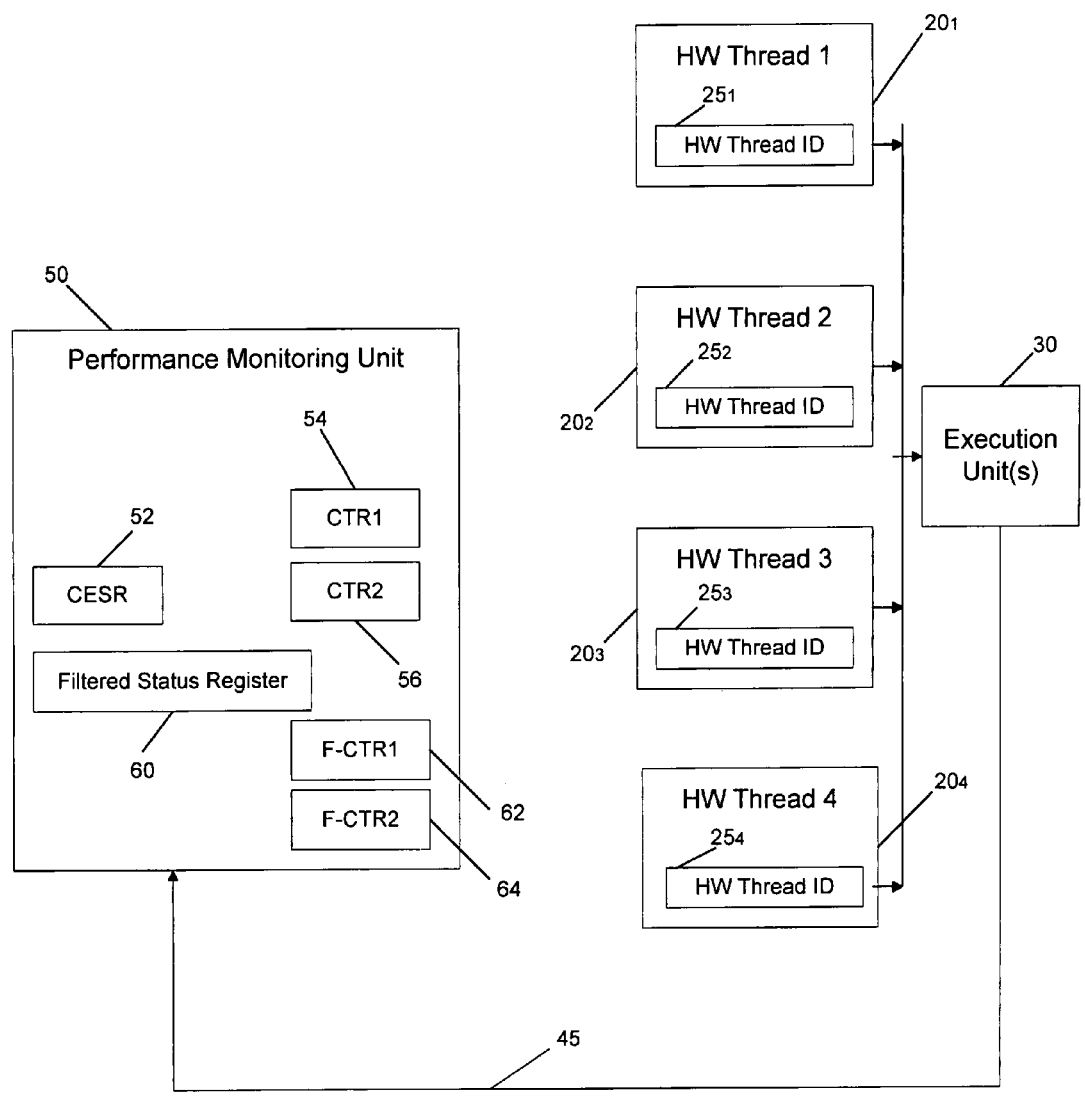
FIG. 1 is a block diagram of a portion of a processor in accordance with an embodiment of the present invention.

Referring now to FIG. 1, shown is a block diagram of a portion of a processor in accordance with an embodiment of the present invention. As shown in FIG. 1, processor 10 includes a plurality of hardware threads $20_1$-$20_4$ (generically hardware thread 20). Each hardware thread 20 may include various hardware registers, storage structures and state so that it can dynamically share a single set of hardware execution units. As examples, various configuration registers, machine specific registers (MSRs) among other such registers may be present in each hardware thread 20. Furthermore, each hardware thread 20 may include a hardware thread identifier (ID) $25_1$-$25_4$ (generically hardware thread ID 25). While this example shows a configuration of four hardware threads per processor, the scope of the present invention may be applied to implementations with any number of hardware threads per processor.

Still referring to FIG. 1, also present in processor 10 is a performance monitoring unit 50. PMU 50 may be used to monitor events occurring during execution in various hardware threads on execution units 30, which may provide feedback information when a particular event occurs during execution along a feedback path 45. Performance monitoring unit 50 may include a control and event select register (CESR) 52 that enables a programmer to encode specific performance event identifiers on which the programmer desires to sample data. Also present are a first global counter 54 and a second global counter 56. Global counters 54 and 56 may be used to count monitored events occurring in execution units 30. For example, in one embodiment global counters 54 and 56 may be 40-bit counters to count one of desired number of events occurring in execution units 30 by any of hardware threads 20. While not shown in FIG. 1, PMU 50 may have pins to support interrupts when a counter overflows its 40-bit representation.

A variety of events may be counted. Broadly, such events may be divided into "occurrence events" (e.g., count the number of times something happened) and "duration events" (e.g., count the passage of time since something happened). Examples of countable events may include, for example, number of data reads, number of data writes, number of floating point operations (FLOPS) executed, number of data cache read misses, number of instruction cache read misses, number of instructions executed, number of clocks that the pipeline was stalled waiting on a data read, and many others.

Referring still to FIG. 1, a filtered status register 60 is also present. Filtered status register 60 may be used to control enabling of filtered performance monitoring using first and second filtered counter registers 62 and 64. In general, CESR 52 and filtered status register 60 controls filtered counter registers 62 and 64. That is, under control of filtered status register 60, PMU 50 may only record performance events from a given hardware thread 20 that is currently enabled as filtered (in filtered status register 60). While this example shows a typical configuration with two filtered counter registers, embodiments may be applied to implementations with any number of filtered counter registers.

In one embodiment, filtered status register 60 may have a plurality of fields such as a single bit each corresponding to a given hardware thread 20. For example, in the implementation of FIG. 1, filtered status register 60 may include 4 bits, one for each of hardware threads 20. A default state may be a logic zero value, which indicates that filtered monitoring is disabled, while a logic one state indicates the enabling of filtered monitoring for a given hardware thread 20.

In various embodiments, software may enable a current hardware thread 20 for filtered performance monitoring using user-level instructions. In one embodiment, an enable instruction may be referred to as ENPFLT while a disable instruction may be referred to as DSPFLT. As described above, these instructions may be user-level instructions that operate in ring 3 software to avoid a transition to operating system (OS) level ring 0 software.

In some implementations use and behavior of a filtered status register and its control instructions may be as follows. First, hardware may default the filtered status register to all 0's to denote that PMU filtering is initially disabled. A programmer may bracket code to be performance analyzed with ENPFLT and DSPFLT instructions. When the core encounters the ENPFLT instruction, it then signals the PMU to enable PMU filtering for the hardware thread on which the instruction was executed. The PMU responds by setting to "1" the corresponding filtered status register bit. The core continues executing code on its hardware threads. For any performance event configured for monitoring (e.g., via the CESR), both the event and the hardware thread ID on which the event occurred are sent to the PMU. When a performance event arrives at the PMU, it will only be recorded if its source hardware ID matches an enabled bit in the filtered status register if filtered monitoring is enabled. Otherwise, the event is ignored, although the event may be recorded in a global counter. When the core encounters the DSPFLT instruction, it will then signal the PMU to disable PMU filtering for the source hardware thread. The PMU responds by setting to "0" the corresponding filtered status register bit.

Note that the presence of global and local filter counters allows for the ability to capture both global events for the entire processor as well as filtered events simultaneously. This may provide for modeling of specific events as a function of the total events observed for a processor. For example, one could count the number of instruction cache miss events generated by a specific software task as a percentage of all of the instruction cache miss events for the entire processor. In this way all events registered in the CESR are accumulated in the global counters, and if the events come from a hardware thread enabled for filtered monitoring, then those events are also accumulated in the filter counters.

Note that while shown in the embodiment of FIG. 1 as including both local and global counters, in some implementations only a single set of counters may be present. Thus only filtered monitoring or global monitoring may be implemented based on whether filtered monitoring is enabled for one of the hardware threads.

Figure 2:
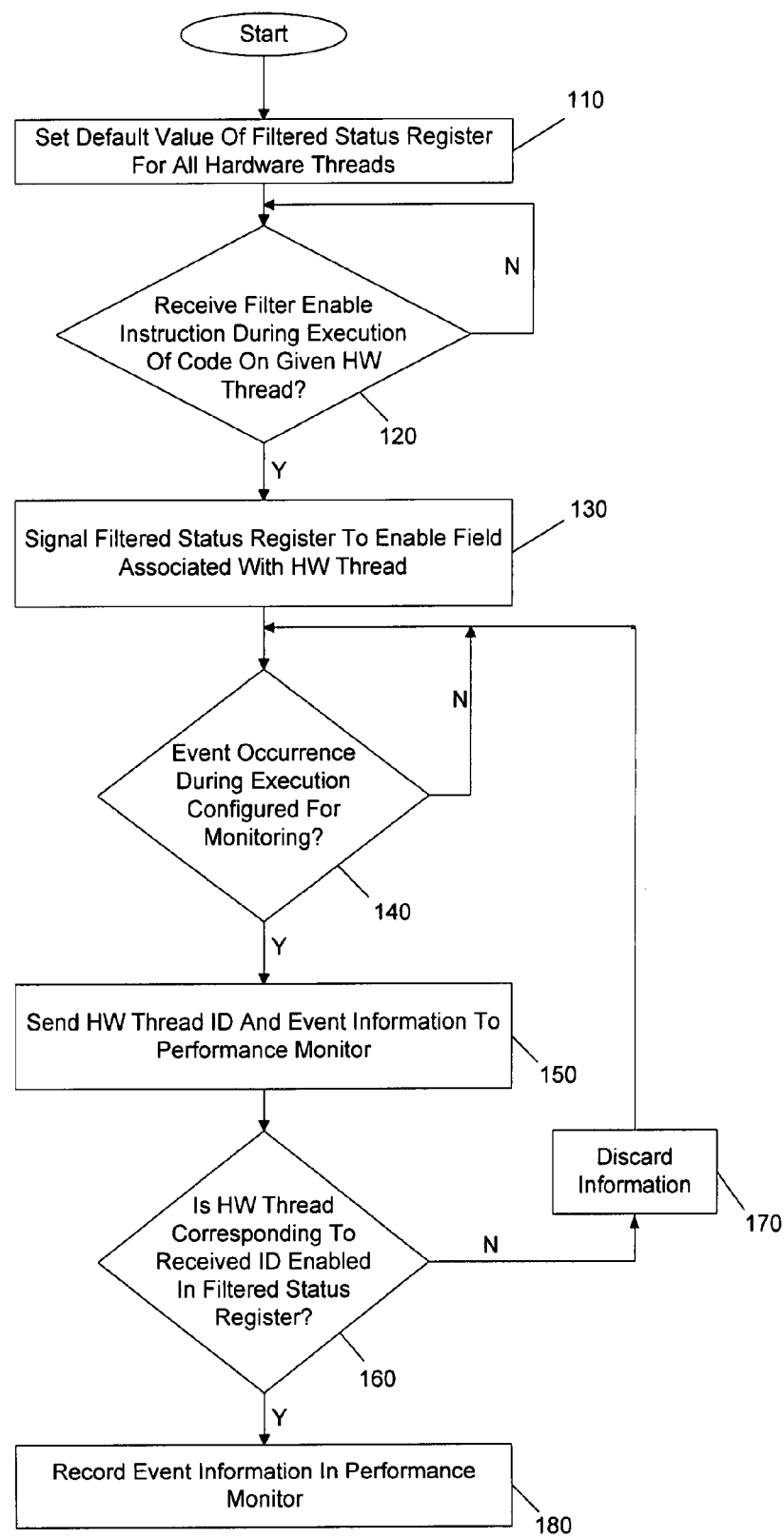
FIG. 2 is a flow diagram of a method in accordance with an embodiment of the present invention.

Referring now to FIG. 2, shown is a flow diagram of a method in accordance with an embodiment of the present invention. As shown in FIG. 2, method 100 may be used to control and perform filtered monitoring during execution of software threads on a given hardware thread. Referring to FIG. 2, method 100 may begin by setting a default value of a filtered status register for all hardware threads (block 110). For example, the default behavior may be set as not enabling filtered monitoring.

Referring still to FIG. 2, next it may be determined whether a filter enable instruction is received (e.g., in an execution unit) during execution of code on a given hardware thread (diamond 120). For example, a programmer may delineate a code portion that is desired for filtered monitoring by insertion of an enable instruction. If no such instruction is received, diamond 120 may loop back on itself. If the instruction is received, control passes to block 130 where the filtered status register may be signaled to enable the associated field for the given hardware thread (block 130). For example, the filtered status register may set bit zero (e.g., corresponding to a first hardware thread) to a logic value of one.

Control passes to diamond 140, where it may be determined whether an event occurs during execution that is configured for monitoring. If not, diamond 140 may loop back on itself. If such an event occurs, the execution unit may send a hardware thread identifier and event information to the performance monitor (block 150). Then, it may be determined whether the hardware thread that corresponds to the received hardware thread ID is enabled in the filtered status register (diamond 160). If not, the information may be discarded (block 170) and control passes back to diamond 140. If instead, the thread is enabled, the event information may be recorded in the performance monitor (block 180). While shown with this particular implementation in the embodiment of FIG. 2, the scope of the present invention is not limited in this regard and other variations are possible.

For example, in an implementation in which both global and filter counters are present, if the given thread is not enabled for filtered monitoring, global counters may be updated nonetheless. Furthermore, other operations may be realized. For example, a programmer may choose to disable filtered monitoring by insertion of a disable instruction. Accordingly, upon execution of such instruction during operation, the execution unit may send a signal to the PMU to disable filtered monitoring. Accordingly, the filtered status register may disable the field or bit associated with that hardware thread.

Still further, in other implementations an OS may choose to swap out a currently executing software thread from one of the hardware threads. To do so, it may perform various context switch operations including saving of a hardware state associated with the software thread. As part of this context switch, the OS may save the value stored in the filtered status register that is associated with this software thread. Furthermore, when swapping in a new context, the filtered status register field or bit associated with this new software thread that is being loaded into a given hardware thread may be loaded into the filtered status register according to its own saved state, which may be in the disabled state. Note that when the original thread resumes execution, the OS may re-enable filtered performance monitoring for whatever hardware thread on which the original software thread is loaded onto.

Thus embodiments may provide for isolated performance insight into events generated by specific pieces of code running in specific software threads. In this way, programmers wishing to gain exact performance insights to specific code segments running in a complex multi-threaded system may do so. Furthermore, embodiments enable performance insights to be reported as a portion of all such events observed for the processor, and may be used in connection with user level threading methodologies such as thread pools. Also, embodiments may be independent of operating system notions of thread or process, and thus are not restricted in its granularity of visibility. As such, embodiments can filter performance events for HW threads, OS processes, OS threads, user threads, and so forth. Accordingly, developers of highly threaded applications on a multi-threaded and/or many core architecture may realize performance analysis for optimizing code, for example, tuning a driver such as a software graphics driver, although the scope of the present invention is not so limited.

Figure 3:
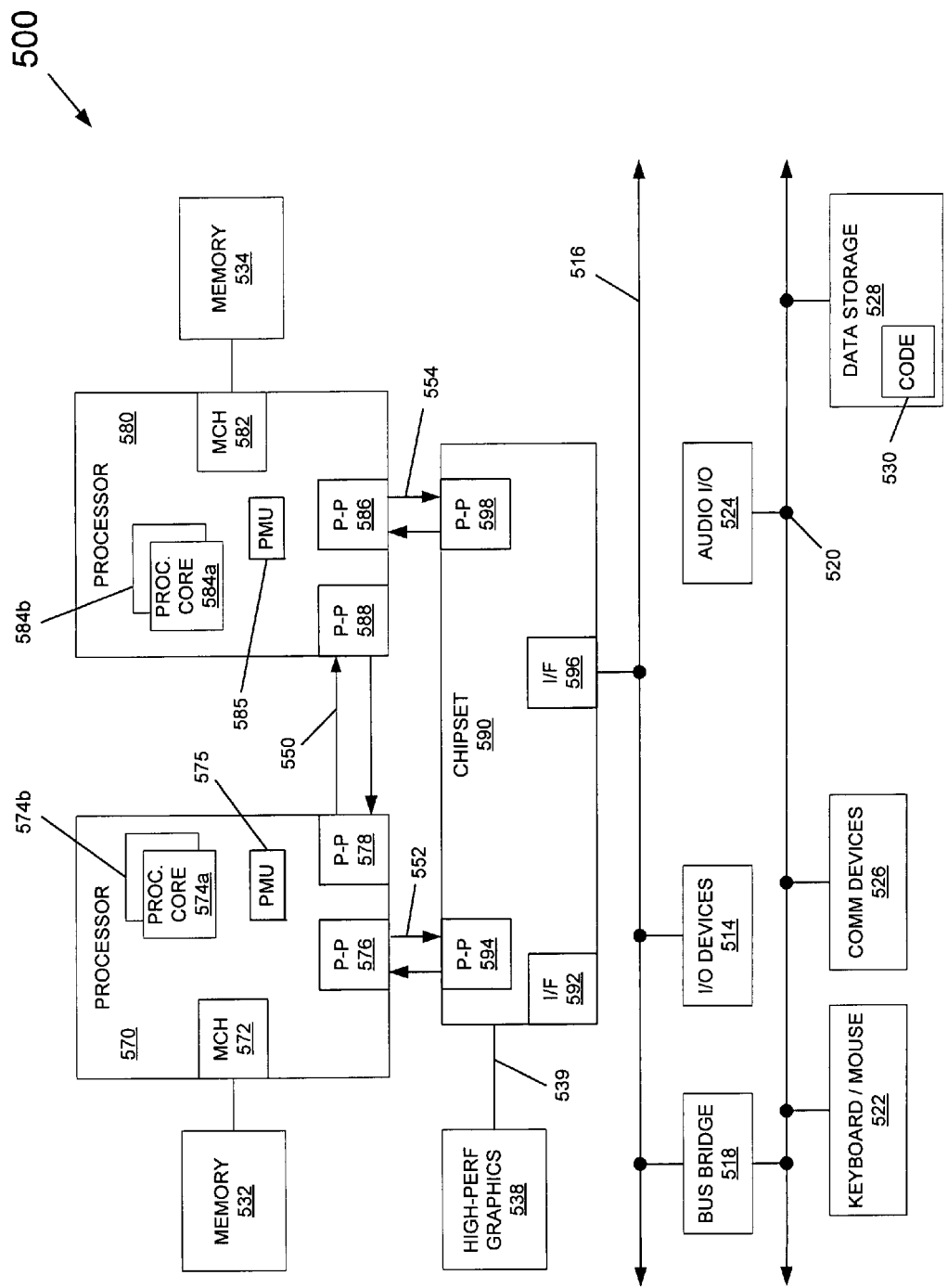
FIG. 3 is a block diagram of a multiprocessor system in accordance with an embodiment of the present invention.

Embodiments may be implemented in many different system types. Referring now to FIG. 3, shown is a block diagram of a multiprocessor system in accordance with an embodiment of the present invention. As shown in FIG. 3, multiprocessor system 500 is a point-to-point interconnect system, and includes a first processor 570 and a second processor 580 coupled via a point-to-point interconnect 550, although a multi-drop bus or another implementation is possible. As shown in FIG. 3, each of processors 570 and 580 may be multi-core processors including first and second processor cores (i.e., processor cores 574*a* and 574*b* and processor cores 584*a* and 584*b*) that may implement filtered monitoring in accordance with an embodiment of the present invention, although other cores may be present. As shown in FIG. 3 PMU's 575 and 585 may be coupled to each pair of processor cores 574a and 574b and 584a and 584b, respectively to perform the filtered monitoring.

Still referring to FIG. 3, first processor 570 further includes a memory controller hub (MCH) 572 and point-to-point (P-P) interfaces 576 and 578. Similarly, second processor 580 includes a MCH 582 and P-P interfaces 586 and 588. As shown in FIG. 3, MCH's 572 and 582 couple the processors to respective memories, namely a memory 532 and a memory 534 (e.g., a dynamic random access memory (DRAM)).

First processor 570 and second processor 580 may be coupled to a chipset 590 via P-P interconnects 552 and 554, respectively. As shown in FIG. 3, chipset 590 includes P-P interfaces 594 and 598 and an interface 592 to couple chipset 590 with a high performance graphics engine 538 via a bus 539. In turn, chipset 590 may be coupled to a first bus 516 via an interface 596. Various input/output (I/O) devices 514 may be coupled to first bus 516, along with a bus bridge 518 which couples first bus 516 to a second bus 520. Various devices may be coupled to second bus 520 including, for example, a keyboard/mouse 522, communication devices 526 and a data storage unit 528 which may include code 530, in one embodiment. Further, an audio I/O 524 may be coupled to second bus 520.

Embodiments may be implemented in code and may be stored on a storage medium having stored thereon instructions which can be used to program a system to perform the instructions. The storage medium may include, but is not limited to, any type of disk including floppy disks, optical disks, compact disk read-only memories (CD-ROMs), compact disk rewritables (CD-RWs), and magneto-optical disks, semiconductor devices such as read-only memories (ROMs), random access memories (RAMs) such as dynamic random access memories (DRAMs), static random access memories (SRAMs), erasable programmable read-only memories (EPROMs), flash memories, electrically erasable programmable read-only memories (EEPROMs), magnetic or optical cards, or any other type of media suitable for storing electronic instructions.

While the present invention has been described with respect to a limited number of embodiments, those skilled in the art will appreciate numerous modifications and variations therefrom. It is intended that the appended claims cover all such modifications and variations as fall within the true spirit and scope of this present invention.

What is claimed is:

1. An apparatus comprising:
   an execution unit to execute instructions of a plurality of threads;
   a storage to store state information and an identity for the plurality of threads; and
   a performance monitor coupled to the storage, the performance monitor including a configuration register to store event information for events to be monitored, a plurality of counters to count occurrence of events associated with the event information, and a filter register having a plurality of fields each field associated with one of the plurality of threads to indicate whether monitoring of events of the thread is enabled, wherein the plurality of counters include a first set of counters each to count events that occur in the plurality of threads during execution on the execution unit and a second set of counters each to count events that occur in a single one of the plurality of threads enabled for filtered monitoring, the filter register controlled by a first user level instruction to enable the filtered monitoring and a second user level instruction to disable the filtered monitoring, the field of the filter register associated with a thread to be stored in a destination storage with state information of the thread on a context switch from the thread, and the stored field is to be loaded into a different field of the filter register when the thread is loaded into a different hardware thread on a second context switch.

2. The apparatus of claim 1, wherein the fields of the filter register are each to store a first state to indicate that the monitoring is enabled and a second state to indicate that the monitoring is disabled.

3. The apparatus of claim 1, wherein the performance monitor is to receive an event identifier and the thread identity from the execution unit and to count the event in one of the second set of counters if the filtered monitoring is enabled, otherwise to count the event in one of the first set of counters if the filtered monitoring is disabled.

4. The apparatus of claim 1, wherein the apparatus comprises a multicore processor including a plurality of processor cores each having a performance monitor coupled to at least one execution unit.

5. A method comprising:
   receiving a signal in a filter register of a performance monitor from an execution unit to enable a field of the filter register associated with a first thread when a filter enable instruction is executed in the execution unit during execution of code of the first thread, the filter register having a plurality of fields each field associated with one of a plurality of threads to indicate whether monitoring of events of the thread is enabled;
   enabling filtered monitoring for the first thread according to a first user level instruction by updating a default value, and disabling the filtered monitoring for the first thread according to a second user level instruction by resetting of the default value;
   receiving a thread identifier and event information in the performance monitor from the execution unit;
   determining if the thread that corresponds to the received thread identifier is enabled in the filter register and if so, storing the event information in a first counter of the performance monitor; and
   storing a value in the field of the filter register associated with a thread in a destination storage upon a context switch from the thread, and loading the stored field into a different field of the filter register when the thread is loaded into a different hardware thread on a second context switch.

6. The method of claim 5, further comprising setting a default value of the filter register for all threads to an unenabled state corresponding to a disabling of filtered monitoring.

7. The method of claim 6, further comprising storing the event information in a global counter of the performance monitor and storing the event information in a filter counter if the filtered monitoring is enabled for a thread that caused generation of the event information, wherein the filter counter corresponds to the first counter.

8. The method of claim 5, further comprising storing the event information in the first counter and a second counter of the performance monitor, wherein the second counter corresponds to a global counter and the first counter corresponds to a filter counter, if the thread corresponding to the received thread identifier is enabled in the filter register, otherwise storing the event information only in the second counter.

9. The method of claim 5, further comprising storing a value in the field of the filter register associated with a thread in a destination storage upon a context switch from the thread.

10. An apparatus comprising:
an execution unit to execute instructions of a plurality of threads; and
a performance monitor coupled to the execution unit, the performance monitor including a plurality of counters to count occurrence of events occurring on the execution unit and a filter register having a plurality of fields each field associated with one of the plurality of threads to indicate whether filtered monitoring of events of the thread is enabled, the field of the filter register associated with a thread to be stored in a destination storage with state information of the thread on a context switch from the thread, the stored field is to be loaded into a different field of the filter register when the thread is loaded into a different hardware thread on a second context switch, wherein the plurality of counters include a first set of counters each to count events that occur in the plurality of threads during execution on the execution unit and a second set of counters each to count events that occur in a single one of the plurality of threads enabled for filtered monitoring, wherein the execution unit is to execute a first user-level instruction to enable the first thread for the filtered monitoring of at least one event and send a signal to the performance monitor to enable the filtered monitoring, and to send event information and an identity of the first thread when an event configured for the filtered monitoring occurs to cause the performance monitor to record the event, and to execute a second user-level instruction to disable the filtered monitoring, wherein the execution unit is to send a second signal to the performance monitor to disable the filtered monitoring.

11. The apparatus of claim 10, wherein during the filtered monitoring, the performance monitor is to update a first counter of the first set of counters on occurrence of a first event on the first thread, and further update a second counter of the second set of counters on the first event occurrence.

12. The apparatus of claim 10, wherein during the filtered monitoring, the performance monitor is to update the first counter and not the second counter on occurrence of the first event on a second thread, the second thread not enabled for filtered monitoring.

* * * * *